United States Patent Office 2,974,155
Patented Mar. 7, 1961

2,974,155

PROCESS FOR THE PRODUCTION OF UNSATURATED COMPOUNDS

Karl Eiter and Ernst Truscheit, Leverkusen-Bayerwerk, Germany, assignors to Farbenfabriken Bayer Aktiengesellschaft, Leverkusen, Germany, a corporation of Germany No Drawing. Filed Oct. 15, 1958, Ser. No. 767,280

Claims priority, application Germany Oct. 18, 1957

12 Claims. (Cl. 260—405.5)

This invention relates to a process for the production of unsaturated compounds, more especially to the dehydration of hydroxy groups containing compounds of the vitamin A, carotene and polyene series.

An object of the present invention is to provide a process for dehydration of compounds containing a hydroxy group. Another object is to provide these unsaturated compounds by an economical process. Furthermore, it is an object of the invention to provide a dehydration process especially suitable for the splitting off of water from hydroxy compounds of the vitamin A, carotene and polyene series. A still further object is to provide a method for dehydration without a retro-ionylidene rearrangement in the case of such compounds which are capable of being rearranged in this way. Further objects will occur hereinafter.

These objects are attained in accordance with the present invention by dehydrating compounds of the vitamin A, carotene and polyene series containing a hydroxy group by a treatment with N-halogen compounds.

For the process of the invention there are used hydroxy groups containing compounds of the vitamin A, carotene and polyene series. Preferably there are used tertiary carbinols of the vitamin A, carotene and polyene series. More preferably there are used such carbinols wherein the carbon atom substituted with the hydroxyl group is connected with an activated methylene group. The activation of this methylene group can be caused, for example, by a nitrile or carbonyl group or by a carbon-carbon double or triple bond.

Examples of the N-halogen compounds used as catalysts are the N-halogen-mono- or diamides of aliphatic mono-carboxylic acids such as N-bromo-acet-amide, N-bromo-diacet-amide or the N-halogen-imides of aliphatic or aromatic dicarboxylic acids such as the N-chloro-, N-bromo- or N-iodo-succinimide, the N-bromo- or N-iodo-phthalimide or the N-bromo- or N-iodo-imide of the 1,8-naphthalene-dicarboxylic acid. The aliphatic carboxylic acids used are for example, those of the lower aliphatic carboxylic acids containing up to about 6 C-atoms. Amounts of 0.1 to 5% by weight of the N-halogen compounds—based on the amount of the hydroxy compound—are used but preferably 0.2 to 1.0% are employed.

The reaction may be carried out in the presence or absence of an inert organic diluent, such as methylene chloride, chloroform, benzene or carbon tetrachloride.

In general the most suitable reaction temperatures are within the range of 30–150° C. If the products are reacted without an organic diluent it can be advantageous to work under vacuum and to heat thereby the reaction mixture slowly to the point where the splitting off of water starts.

A supreme advantage of the process according to the invention is the possibility of dehydrating alcohols of the vitamin A, polyene and carotene series without any retro-ionylidene rearrangement taking place.

The compounds obtained by the process are for example useful intermediate products for the synthesis of carotene or vitamin A.

The following examples are for the purpose to illustrate the invention:

Example 1

20 grams of β-ionol acetonitrile 5-(2',6',6'-trimethyl-cyclohexen-1'-yl)-3-methyl - 3 - hydroxy - 4 - pentene - 1-acid nitrile are dissolved in 200 cc. absolute carbon tetrachloride, 100 mg. of N-bromo-succinimide are added and the solution is refluxed for 45 minutes. After cooling the reaction mixture is washed with 0.1 N-sodium thiosulfate solution and water, dried then over sodium sulfate, the solvent is evaporated and the remaining residue distilled in high vacuum. 18.5 grams of a yellowish β-ionylidide acetonitrile ($n_D^{20}$ 1,5532); $\lambda_{max}$ 303 and 258 mμ (log $\epsilon$=4.06 and 4.04) go over at 0.001 mm. Hg and a temperature of 120° C. in the air bath. The infra-red spectrum shows no OH-band.

Instead of 100 mg. N-bromosuccinimide 50 mg. of the same substance may be used. Heating to boiling point has to be continued for about one hour in this case.

Instead of the N-bromo succinimide there can be used also N-iodo succinimide, N-bromo- and N-iodophthalimide.

Example 2

8 grams of 3-methyl-3-hydroxy-4-hexene-1-acid nitrile are dissolved in 100 cc. absolute carbon tetrachloride. The solution thus obtained is heated under nitrogen to boiling point and kept under reflux for one hour after 80 mg. N-bromo-succinimide being added. By working up as indicated in Example 1, 7.5 g. of an unsaturated nitrile is obtained, which distils over as a pale oil in high vacuum at 0.001 mm. Hg and at a temperature of 60° C. in the air bath, said nitrile having an ultraviolet main absorption band at 263 mμ (log $\epsilon$=3.3). The reaction product was identified as 3-methyl-2,4-hexadiene-1-acid nitrile. The infra-red spectrum shows no OH-band.

Example 3

20 grams of β-ionol-crotonic acid ethyl ester 7-(2',6',6'-trimethyl cyclohexene-1'-yl) - 5 - methyl - 5 - hydroxy-2,6-heptadiene-1-acid ethyl ester are dissolved in 200 cc. absolute benzene. The solution thus obtained is heated under nitrogen to boiling point, 100 mg. of N-iodo-succinimide are added and the mixture is refluxed for one hour. After being washed with 0.1 N-aqueous sodium thiosulfate solution the liquor is dried and the solvent evaporated. The remaining 19.5 g. residue distil over as a viscous oil under high vacuum at 0.001 mm. Hg and an air bath temperature of 140–150° C. The ultra-violet spectrum of the obtained β-ionylidene crotonic acid ethyl ester 7-(2',6',6'-trimethyl cyclohexene-1'-yl)-5-methyl-2,4,6-heptatriene-1-acid ethyl ester shows a sharp main absorption band at 333 mμ (log $\epsilon$=4.2) while in the infra-red spectrum no OH-band is detectable.

200 mg. of N-iodo-succinimide may be used in the place of 100 mg. but the solution has then to be refluxed for about 40 minutes.

The same result is obtained by using N-bromo-succinimide instead of the N-iodo-succinimide.

Example 4

5 grams β-ionol-crotonic acid ethyl ester are mixed with 25 mg. N-iodo-succinimide and slowly heated in an oil bath to a temperature of 70° C. under a vacuum of 14 mm. Hg. A violent bubble formation begins and the mixture is kept at this temperature until the evolution of gas has ceased. After cooling under vacuum the substance is dissolved in ether, the ethereal solution is washed with 0.1 N-sodium thiosulfate solution and water, dried over sodium sulfate and the ether is evaporated. 4.9 grams residue are obtained, which distil over as a yellow-greenish viscous oil under high vacuum (0.001 mm. Hg) and at an air bath temperature of 140° C.

The main absorption band of the ultra-violet spectrum lies at 333 m$\mu$ (log $\epsilon$=4.2). The obtained compound is identified as β-ionylidene-crotonic acid ethyl ester. No. OH-band is detectable in the infra-red spectrum.

*Example 5*

A 1% solution of N-bromo-diaceto-amide in absolute carbon tetrachloride is prepared by the method described by R. E. Buckles, R. C. Johnson and B. J. Probst (Journal Organic Chemistry, Volume 22, page 55 (1957)). 10 grams of this solution are heated together with 5 g. of β-ionol-crotonic acid ethyl ester in 40 cc. of absolute carbon tetrachloride to the boil for 2 hours under reflux in a nitrogen atmosphere. Thereafter the reaction mixture is cooled, diluted with ether and treated with aqueous 1/10 N-sodium-thiosulfate solution and water. The organic phase is then dried over sodium sulfate and the solvent evaporated under diminished pressure. The residue is distilled in high vacuum. Thus there are obtained about 4 g. of the β-ionylidene-crotonic acid ethyl ester 7-(2',6',6'-trimethyl cyclohexene-1'-yl) - 5 - methyl-2,4,6-heptatriene-1-acid ethyl ester. Boiling point 140° C. air bath temperature 0.001 mm. Hg $\lambda_{max}$ 331 m$\mu$ (log $\epsilon$=4.2).

*Example 6*

The solution of 10 grams β-ionol crotonic acid ethyl ester in 100 cc. methylene chloride, chloroform or carbon tetrachloride is refluxed for 30–50 minutes after adding 100–150 mg. N-iodo-phthalimide. The cooled mixture is diluted with ether and the solution is shaken with an excess of 1/10 N-sodium thiosulfate solution, water, 1-N-sodium hydroxide solution and then with water again. After drying over sodium sulfate the solvent is evaporated under diminished pressure. 9 grams of β-ionylidene-crotonic acid ethyl ester are obtained as a light-brown, oily liquor, the infra-red spectrum of which shows no OH-band. The very clear ultra-violet spectrum of the crude product has a maximum absorption band at 331 m$\mu$ (log $\epsilon$=4.2).

The same result is obtained if instead of the N-iodo-phthalimide there is used N-bromo-phthalimide or N-bromo-acet-amide.

*Example 7*

7 grams of 9-(2',6',6'-trimethyl cyclohexen-1'-yl)-3,7-dimethyl-3-hydroxy-4,6,8-nonatriene - 1 - acid nitrile are mixed with 100 mg. of N-iodo-succinimide in a round bottom flask and then slowly heated in an oil bath above a temperature of 80° C.

After a short time bubbles are formed, but the evolution of gas stops after about 20 minutes.

After cooling the contents of the flask are taken up with ether, the ethereal solution is washed with sodium thiosulfate solution and water, dried and evaporated in vacuo. The residue distils over at 0.001 mm. Hg and an air-bath temperature of 160–170° C. as an orange-yellow thickly oil, the clear ultra-violet spectrum of which shows a main absorption band at 352 m$\mu$ (log $\epsilon$=4.37), while the infra-red spectrum shows a sharp $\alpha,\beta$-unsaturated C≡N band, but no OH-band at all.

Instead of the N-iodo-succinimide there can be used also N-bromo-succinimide, N-iodo- and N-bromophthalimide.

*Example 8*

11.9 grams of crude 9-(2',6',6'-trimethyl cyclohexen-1'-yl)-3,7-dimethyl - 3 - hydroxy-4,6,8-nonatriene-1-acid methyl or ethyl ester are dissolved in 100 cc. carbon tetrachloride and the solution thus obtained is boiled under nitrogen together with 100 mg. N-iodo-succinimide for one hour. After cooling water drops could be seen on the surface of the solution. It is washed under nitrogen with an excess of sodium thiosulfate solution and water, the solution of carbon tetrachloride is dried over sodium sulfate and evaporated under nitrogen in vacuo. There remain 11.2 grams unsaturated vitamine-A-acid ethyl or methyl ester which distil over under high vacuo at 0.001 mm. Hg and an air-bath temperature of 150–170° C. as an orange-yellow oil. The ultra-violet spectrum of this ester shows only one absorption band at 350 m$\mu$ (log $\epsilon$=4.5), while an unsaturated ester obtained by treatment with a "classic" dehydrating agent like oxalic acid, toluene sulfonic acid or phosphorous oxychloride shows three characteristic absorption bands at 365 m$\mu$ 349 m$\mu$ and 333 m$\mu$ which are caused by the retroester portion being present. The ester obtained as described above can be converted by alkaline saponification into the known all-trans vitamin-A-acid with a melting point of 186.5° C.

The same result is obtained if N-bromo-succinimide is used instead of the N-iodo-succinimide.

*Example 9*

The dehydration of the same hydroxy ester as applied in Example 8 leads in the same way to vitamine-A-acid ester if N-iodo-phthalimide is employed.

19 grams of the hydroxy ester are dissolved in 150 cc. absolute carbon tetrachloride and the solution thus obtained is refluxed under nitrogen after adding 200 mg. N-iodo-phthalimide. The working up as described in Example 8 yields 18 grams crude vitamine-A-acid ester the ultra-violet spectrum of which shows an absorption band at 350 m$\mu$ (log $\epsilon$=4.48). The infra-red spectrum shows the $\alpha,\beta$-unsaturated ester carbonyl band but no OH-band is detectable. The alkaline saponification also yields a trans-vitamin-A-acid with a melting point of 186.5° C.

The same result is obtained if N-bromo-phthalimide is used instead of the N-iodo-phthalimide.

What we claim is:

1. Process for the production of unsaturated compounds which comprises reacting a compound which is a member selected from the group consisting of the vitamin A, carotene and polyene series, said compound containing a tertiary hydroxyl group with an N-halogen compound selected from the group consisting of N-halogen monoamides and diamides of aliphatic monocarboxylic acids containing up to six carbon atoms and N-halo-imides of aliphatic and aromatic dicarboxylic acids.

2. Process as claimed in claim 1, wherein the treatment is carried out at a temperature up to about 150° C.

3. Process as claimed in claim 1, wherein said treatment is carried out in the presence of an inert organic diluent.

4. Process as claimed in claim 1, which comprises using N-iodophthalimide as N-halogen compound.

5. Process as claimed in claim 1, which comprises using N-bromo-succinimide as N-halogen compound.

6. Process as claimed in claim 1, which comprises using N-iodo-succinimide as N-halogen compound.

7. Process for the production of β-ionylidene-acetonitrile which comprises treating β-ionol-acetonitrile at elevated temperature with N-bromo-succinimide and recovering the β-ionylidene-acetonitrile formed.

8. Process for the production of β-ionylidene-crotonic-acid ester which comprises treating β-ionol-crotonic acid ester at elevated temperature with a member selected from the group consisting of N-bromo-succinimide, N-iodo-succinimide, N-iodo-phthalimide and N-bromo-phthalimide and recovering the β-ionylidene crotonic acid ester formed.

9. Process for the production of vitamin-A-acid nitrile which comprises treating 9-(2',6',6'-trimethyl cyclohexen-1'-yl)-3,7-dimethyl-3-hydroxy - 4,6,8 - nonatriene-1-acid nitrile at elevated temperature with a member selected from the group consisting of N-bromo-succinimide, N- iodo-succinimide, N-iodo-phthalimide and N-bromophthalimide and recovering the vitamin-A-acid nitrile formed.

10. Process for the production of vitamin-A-acid ester which comprises treating 9-(2',6', 6'-trimethyl cyclohexen-1'-yl)-3,7-dimethyl-3-hydroxy-4,6,8-nonatriene - 1-acid ethyl ester at elevated temperature with a member selected from the group consisting of N-bromo-succinimide, N-iodo-succinimide, N-iodo-phthalimide and N-bromo-phthalimide and recovering the vitamin-A-acid ester formed.

11. Process according to claim 1, in which said N-halogen compound is used in the amount of 0.1 to 5% by weight of said compound to be dehydrated.

12. Process according to claim 1, in which said N-halogen compound is used in the amount of 0.2 to 2% by weight of said compound to be dehydrated.

References Cited in the file of this patent

UNITED STATES PATENTS

| | | |
|---|---|---|
| 2,451,741 | Huber | Oct. 19, 1948 |
| 2,576,103 | Cawley et al. | Nov. 27, 1951 |
| 2,576,104 | Shantz | Nov. 27, 1951 |

OTHER REFERENCES

Henbest et al.: Journal Chem. Soc. (London), 1955, 2763–2767.